(12) United States Patent
Murayama et al.

(10) Patent No.: US 8,330,860 B2
(45) Date of Patent: Dec. 11, 2012

(54) COLOR SIGNAL PROCESSING CIRCUIT, COLOR SIGNAL PROCESSING METHOD AND TELEVISION SYSTEM

(75) Inventors: Akihiro Murayama, Kanagawa (JP); Hitoshi Banba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 263 days.

(21) Appl. No.: 12/796,216

(22) Filed: Jun. 8, 2010

(65) Prior Publication Data

US 2010/0315554 A1 Dec. 16, 2010

(30) Foreign Application Priority Data

Jun. 12, 2009 (JP) ................................. 2009-141409

(51) Int. Cl.
*H03L 7/00* (2006.01)
*H04N 9/66* (2006.01)
*H04N 5/08* (2006.01)

(52) U.S. Cl. ........ 348/539; 348/525; 348/547; 348/549; 348/638

(58) Field of Classification Search .................. 348/708, 348/516, 517, 520, 525, 527, 536, 537, 539, 348/547, 549, 572, 573, 638, 639; H04N 9/64, 9/475, 5/08, 9/66; H03L 7/00
See application file for complete search history.

(56) References Cited

U.S. PATENT DOCUMENTS 6,295,084 B1 * 9/2001 Nishizawa et al. ......... 348/211.1
6,538,702 B1 * 3/2003 Taketani et al. .............. 348/638

FOREIGN PATENT DOCUMENTS

JP 2000-156795 6/2000

* cited by examiner

*Primary Examiner* — Sherrie Hsia
(74) *Attorney, Agent, or Firm* — Turocy & Watson, LLP

(57) ABSTRACT

According to embodiments, a color signal processing circuit includes: an A/D converter configured to convert an analog television signal into a digital signal by using a clock; a color signal demodulation circuit configured to color-demodulate the television signal converted into the digital signal by the A/D converter; a clock generation section configured to generate the clock that is used by the A/D converter; and a frequency control section configured to control the clock frequency of the clock generation section on the basis of a color subcarrier frequency of a color signal included in the analog television signal and on the basis of the vertical synchronization signal frequency of the analog television signal.

12 Claims, 6 Drawing Sheets

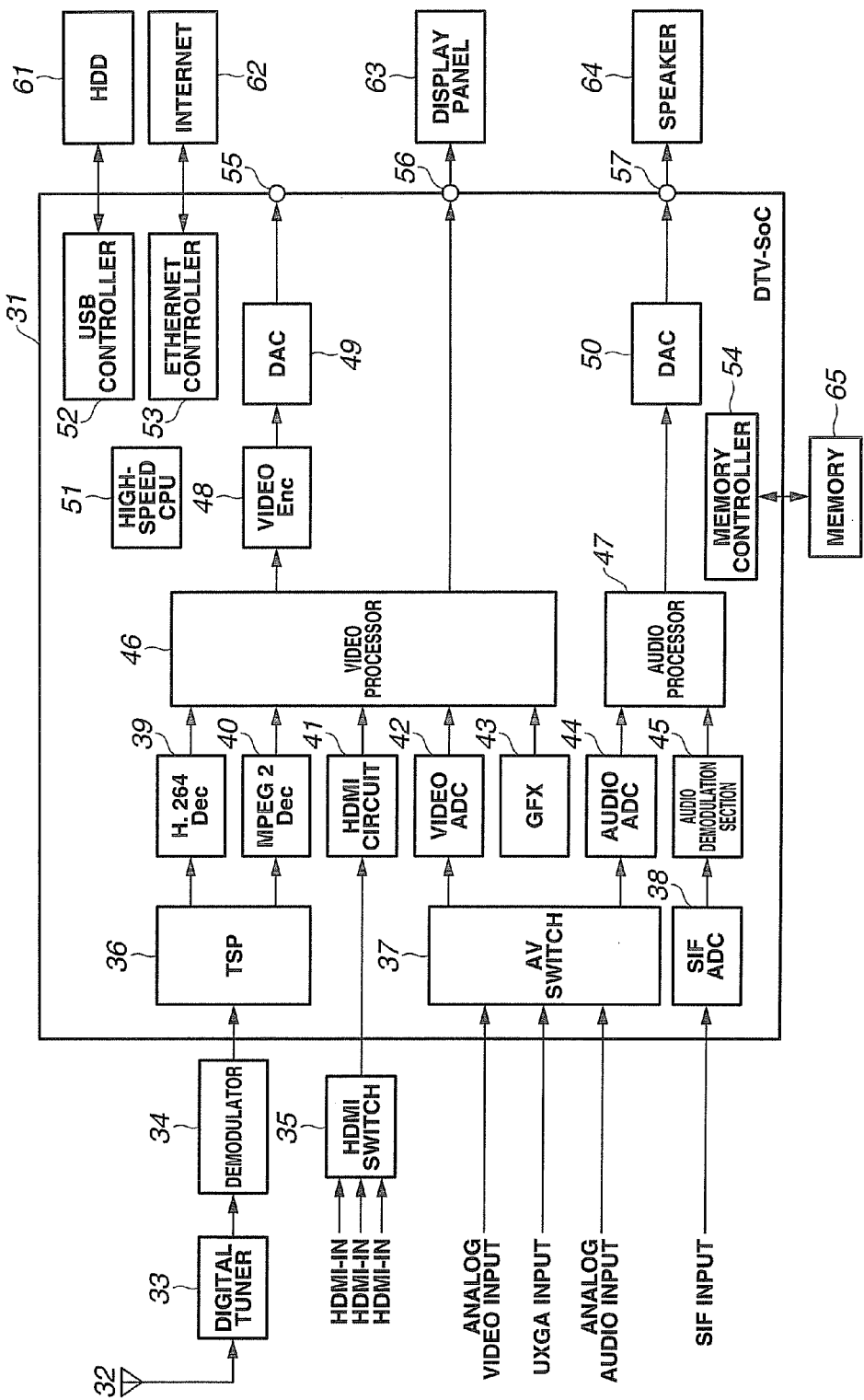

COLOR SIGNAL PROCESSING CIRCUIT, COLOR SIGNAL PROCESSING METHOD AND TELEVISION SYSTEM

CROSS-REFERENCE TO RELATED APPLICATION(S)

This application is based upon and claims the benefit of priority from Japanese Patent Application No. 2009-141409 filed on Jun. 12, 2009, the entire contents of which are incorporated herein by reference.

BACKGROUND

1. Field

Embodiments described herein relate generally to a color signal processing circuit, a color signal processing method, and a television system.

2. Description of the Related Art

Conventionally, in an analog television broadcast receiver, a composite video baseband signal (CVBS signal) is obtained by demodulating an analog broadcast signal by a channel selection circuit and an intermediate frequency processing circuit. This demodulated video baseband signal is supplied to a color signal processing circuit, so that the color demodulation is performed.

In the conventional color signal processing circuit, the inputted composite video baseband signal is converted into a digital signal by an A/D converter. A color signal demodulation circuit in the color signal processing circuit is configured to obtain a color difference signal by applying AM demodulation processing, which uses a carrier based on the same clock signal as the clock signal used in the A/D converter, to the composite video baseband signal converted into the digital signal.

Note that Japanese Patent Application Laid-Open Publication No. 2000-156795 proposes an apparatus which automatically adjusts the frequency and phase of the sampling clock at the time of converting a video signal into a digital signal.

Here, there is no problem if the video signal has a sufficient level as an analog television signal inputted into the receiver. However, there is a case where since the radio-wave reception intensity is low, the amplitude of the analog television signal as a whole is small. In this case, there is a problem that when an image, which is based on the color difference signal demodulated by the color signal demodulation circuit, is projected, a stripe pattern may appear on the screen, thereby degrading video quality.

BRIEF DESCRIPTION OF THE DRAWINGS

FIG. 8 is a block diagram showing an example of a television system to which a color signal processing circuit is mounted.

DETAILED DESCRIPTION

A color signal processing circuit according to an aspect of the present invention includes: an A/D converter configured to convert an analog television signal into a digital signal by using a clock; a color signal demodulation circuit configured to color-demodulate the television signal converted into the digital signal by the A/D converter; a clock generation section configured to generate the clock that is used by the A/D converter; and a frequency control section configured to control the clock frequency of the clock generation section on the basis of a color subcarrier frequency of a color signal included in the analog television signal and on the basis of the vertical synchronization signal frequency of the analog television signal.

Figure 1:
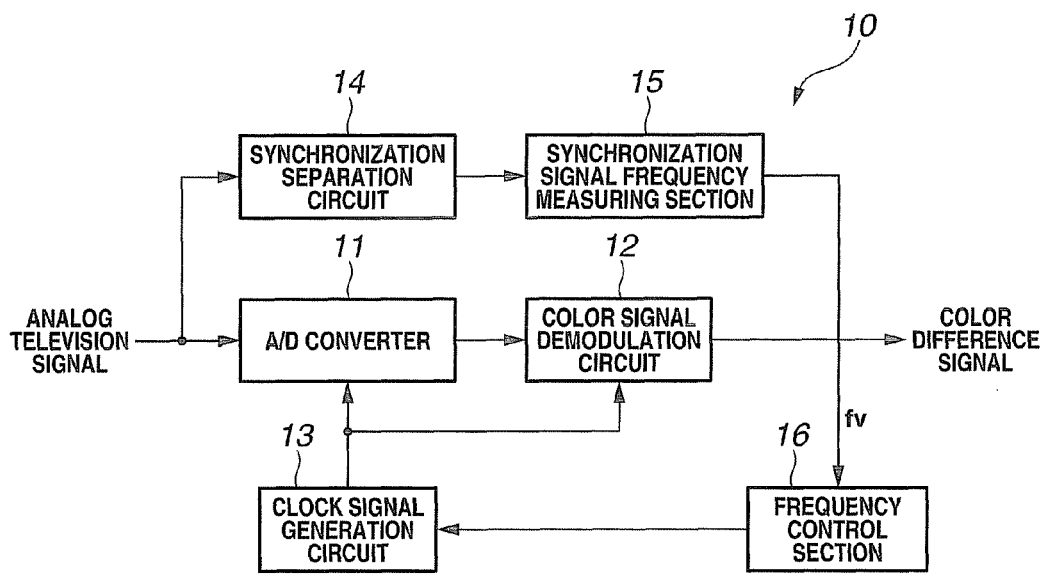
FIG. 1 is a block diagram showing a color signal processing circuit according to a first embodiment of the present invention.

In the following, embodiments according to the present invention will be described in detail with reference to the accompanying drawings. FIG. 1 is a block diagram showing a color signal processing circuit according to a first embodiment of the present invention.

First, with reference to an illustration shown in FIG. 2, the cause of generation of vertical stripes will be described.

Generally, since color signal processing is digitized, an analog composite video baseband signal (CVBS signal) inputted into the color signal processing circuit is A/D converted into a digital signal and is thereafter supplied to a color signal demodulation circuit. However, fold-back distortion generated at the time of A/D conversion may be mixed in the color signal band.

For example, in the case of the PAL system, an A/D-converted color signal, which has the color subcarrier frequency (fsc) of 4.43361875 MHz, is AM-modulated. Thus, the A/D-converted color signal includes harmonic having frequencies 2fsc, 3fsc, . . . , other than the fundamental wave signal. Further, due to fold-back distortion at the time of A/D conversion, the arrangement of the harmonic components is folded back with the half frequency of the sampling frequency as the center.

Figure 2:
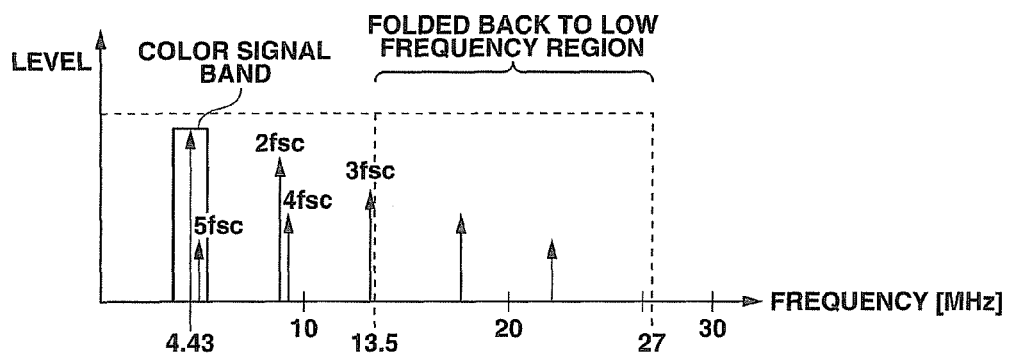
FIG. 2 is an illustration for explaining the cause of generation of vertical stripes.

FIG. 2 shows, by arrows, the outputs quantized through A/D conversion in the case where the sampling frequency is set at 27 MHz. The frequency components of 13.5 MHz or more, which is one half the sampling frequency, are folded back into the frequency band of 0 to 13.5 MHz. For example, the harmonic having the frequency of 4fsc (about 17.7 MHz) is folded back to the frequency position around (13.5−(4fsc−13.5))=9.3 MHz. Similarly, the harmonic having the frequency of 5fsc (about 22.2 MHz) is folded back to the frequency position around (13.5−(5fsc−13.5))=4.832 MHz.

That is, the harmonic component of the frequency 5fsc is folded back into the frequency band of the transmitted color signal. These outputs quantized through A/D conversion are AM-demodulated by the color signal demodulation circuit by using the carrier of the color subcarrier frequency. Therefore, other than the originally required color difference signal, a component (4.832-fsc) obtained by demodulating the fifth harmonic, that is, an unnecessary signal of about 400 KHz is included in the color demodulation output. The beat component between such harmonic distortion and the color subcarrier appears as a color stripe pattern on the screen. Note that the order of the harmonic components entering into the color signal band differs depending on the sampling frequency.

It is generally known that when A/D conversion is performed, and when the amplitude of an input signal is comparatively small with respect to the input dynamic range, the influence of the harmonic distortion component of the input signal is increased. That is, when the amplitude of an input signal is comparatively small, the level of the harmonic distortion component is comparatively large with respect to the input signal, so that the image quality is significantly degraded. The unnecessary signal included in the color signal output cannot be discriminated from the necessary color difference signal in the subsequent processing, and hence it is difficult to remove the unnecessary signal in the subsequent processing.

Figure 3:
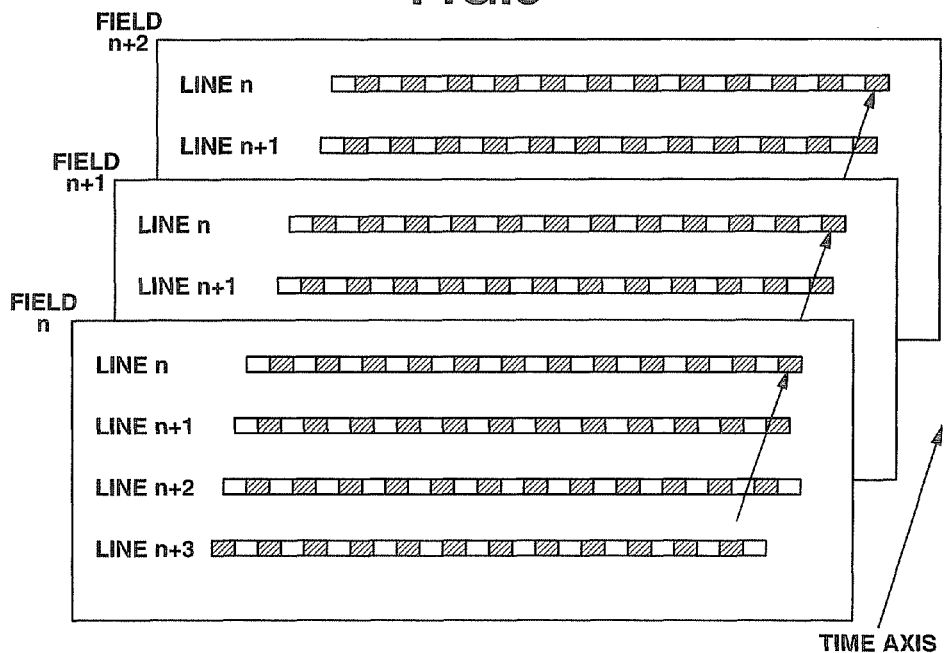
FIG. 3 is an illustration showing a state where oblique stripes are generated by unnecessary signal components.
Figure 4:
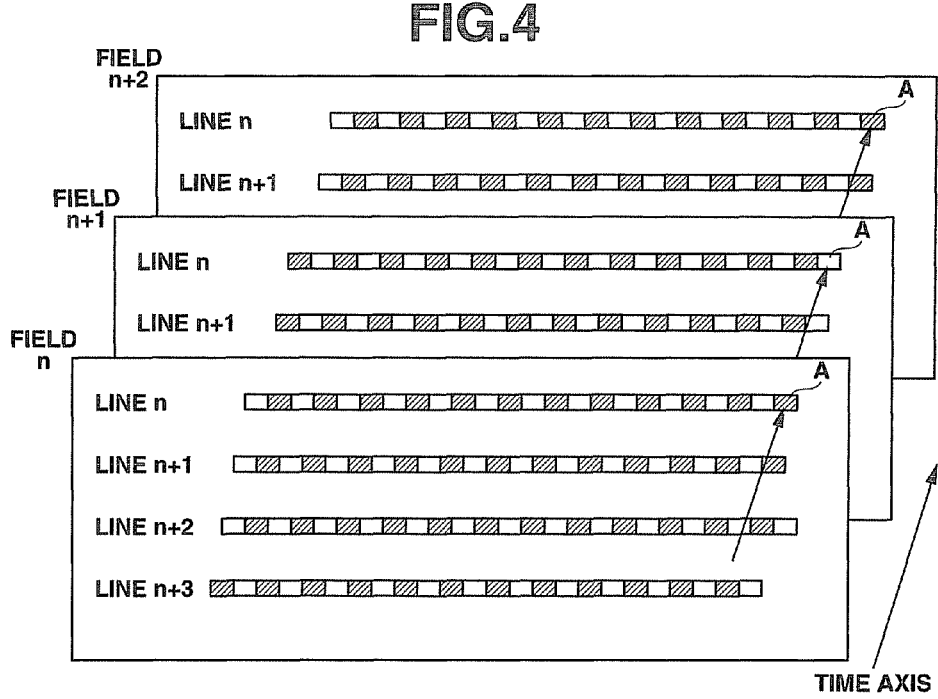
FIG. 4 is an illustration showing a state where the oblique stripes generated by unnecessary signal components look eliminated.

Next, an oblique stripe removing method according to the present embodiment will be described with reference to the illustrations of FIG. 3 and FIG. 4. FIG. 3 shows a state where an oblique stripe is generated due to the unnecessary signal component, while FIG. 4 shows a state where the oblique stripe due to the unnecessary signal component looks eliminated. In FIG. 3 and FIG. 4, each of continuous fields is represented by a square frame, and an elongated frame in each of the square frames represents each line.

In FIG. 3 and FIG. 4, the beat component between the unnecessary signal and the color subcarrier signal is represented as a light portion (plain portion) and a dark portion (hatched portion) in the respective lines of three continuous fields n, n+1 and n+2. Further, in FIG. 3, the phases of the light portion and the phase of the dark portion in the each of the fields n, n+1 and n+2 coincide with each other. Therefore, at the same position on the screen, the light portion and the dark portion are respectively formed continuously in time, so that an oblique appears on the screen due to the light and dark portions of the plurality of lines.

On the other hand, in FIG. 4, the phase of the light and dark portions on the same line is inverted between the respective fields n, n+1 and n+2. That is, at the same position on the screen, the light portion and the dark portion are exchanged with each other every field. Therefore, the light portion and the dark portion cancel each other at the same position on the screen, so as to prevent the oblique stripe from appearing on the screen. For example, in a pixel A on the screen in FIG. 4, when it is configured such that the light portion and the dark portion due to the unnecessary component alternate every field, the light and dark portions cancel each other on the time axis.

The oblique stripe due to the light and dark portions is generated by the beat component between the fold-back harmonic component as the unnecessary signal and the color subcarrier signal. The frequency of the light and dark portions is determined on the basis of the frequency of the beat component. In order to invert the light and dark portions every field as shown in FIG. 4, it is only necessary that the frequency of the beat component be set to an odd multiple of one-half the vertical frequency.

The frequency of the beat component is determined by the frequency of the harmonic mixed into the color signal band and by the color subcarrier frequency. The frequency position of the fold-back harmonic component is determined by the sampling frequency. Therefore, the oblique stripe due to the beat component can be prevented from appearing on the screen by setting the sampling frequency so that the difference between the frequency of the fold-back harmonic component and the color subcarrier frequency becomes an odd multiple of one-half the vertical frequency and thereby the beat component is inverted every field.

In FIG. 1, an analog television signal, such as a composite video baseband signal (CVBS signal), and the like, is supplied to an A/D converter 11 and a synchronization separation circuit 14 which configure a color signal processing circuit 10. This composite video baseband signal is obtained by demodulating an analog broadcast signal by a channel selection circuit and an intermediate frequency processing circuit.

The A/D converter 11 samples the inputted analog television signal on the basis of a clock supplied from a clock signal generation circuit 13 as will be described below, so as to convert the inputted analog television signal into a digital signal. The digital signal from the A/D converter 11 is supplied to a color signal demodulation circuit 12.

The color signal demodulation circuit 12 is configured to receive the same clock signal as the clock signal supplied to the A/D converter 11 from the clock signal generation circuit 13, and to obtain a color difference signal by performing AM demodulation processing using a carrier signal based on the same clock signal as the clock signal used by the A/D converter.

In the present embodiment, the clock signal generation circuit 13 is configured to generate a clock which is used to make the difference between the frequency of the fold-back harmonic component and the color subcarrier frequency become an odd multiple of one-half the vertical frequency. The color subcarrier frequency is specified by a broadcast system. Therefore, a clock of a fixed clock frequency according to the broadcast system may be generated in the clock signal generation circuit 13. However, it is considered that the color subcarrier frequency is varied in a signal source apparatus, and hence it is preferred to obtain the color subcarrier frequency at the time of reception.

The color signal is superimposed only on the color video signal. Further, the color signal is a discontinuous signal and hence cannot be directly measured by using a frequency counter, and the like. However, there is a fixed relationship of the color subcarrier frequency (fsc) with the horizontal synchronization signal frequency (fH) and the vertical synchronization signal frequency (fV) which are included in the analog television signal. For example, in the PAL system, the relationship is defined as follows.

$$fsc = (1135/4) \times fH + fV/2 \qquad (1)$$

Thus, the present embodiment is configured such that the color subcarrier frequency is estimated on the basis of the synchronization signal included in the received analog television signal. When receiving the analog television signal, the synchronization separation circuit 14 separates at least one of the horizontal synchronization signal and the vertical synchronization signal, so as to output the separated synchronization signal to a synchronization signal frequency measuring section 15. The synchronization signal frequency measuring section 15 outputs the vertical synchronization signal frequency fv to a frequency control section 16 in order that the color subcarrier frequency fsc is obtained by the frequency control section 16 on the basis of Equation (1).

Note that since the horizontal synchronization signal frequency fh and the vertical synchronization signal frequency fv have a relationship specified by a broadcast system, it may also be configured such that the synchronization signal frequency measuring section 15 obtains the horizontal synchronization signal fh in place of the vertical synchronization signal fv, so as to output the obtained signal to the frequency control section 16.

The frequency control section 16 is configured to be able to change the frequency of the clock signal by controlling the clock signal generation circuit 13. For example, the clock signal generation circuit 13 can be configured by a crystal oscillator NCO (Numerically Controlled Oscillator), a PLL circuit, and the like, (both unshown), and is configured to be able to generate a clock of an oscillation frequency based on a control value given from the frequency control section 16.

When receiving the vertical synchronization signal frequency fv, the frequency control section 16 obtains the color subcarrier frequency fsc on the basis of Equation (1), and controls the clock oscillation frequency of the clock signal generation circuit 13 so that the difference between the frequency of the fold-back harmonic component and the color subcarrier frequency becomes an odd multiple of one-half the vertical frequency.

Note that the frequency control function of the frequency control section 16 can be realized by hardware as well as by software.

Figure 5:
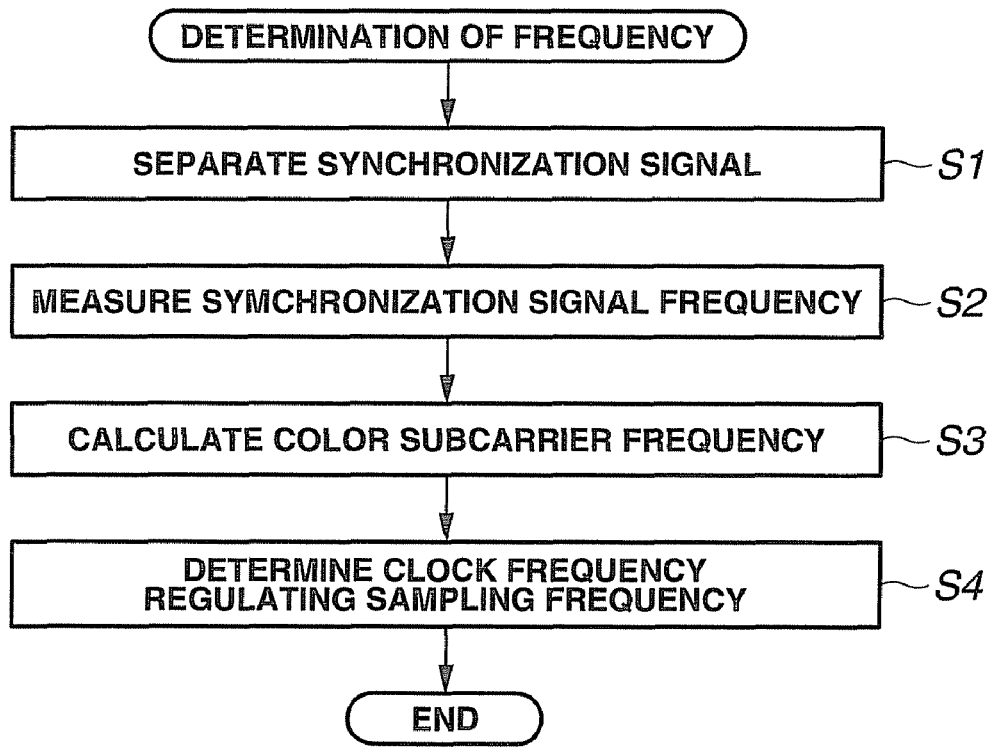
FIG. 5 is a flow chart for explaining an operation of the first embodiment.

Next, the operation of the present embodiment configured as described above will be described with reference to a flow chart shown in FIG. 5.

An analog television signal is given to the synchronization separation circuit 14, so as to be subjected to the synchronization separation (step S1). At least one of the horizontal synchronization signal and the vertical synchronization signal is separated by the synchronization separation circuit 14, so that the separated signal is given to the synchronization signal frequency measuring section 15 from the synchronization separation circuit 14. In order to enable the color subcarrier frequency to be obtained on the basis of Equation (1), the synchronization signal frequency measuring section 15 obtains the vertical synchronization signal fv from the output of the synchronization separation circuit 14, and supplies the vertical synchronization signal fv to the frequency control section 16 (Step S2).

The frequency control section 16 obtains the color subcarrier frequency fsc from the vertical synchronization signal fv on the basis of Equation (1) (step S3). The frequency control section 16 determines a sampling frequency by using the obtained color subcarrier frequency fsc so that the difference between the frequency of the fold-back harmonic component generated at the time of A/D conversion of the analog television signal and the color subcarrier frequency becomes an odd multiple of one-half the vertical frequency. Then, the frequency control section 16 instructs the clock signal generation circuit 13 to oscillate at the determined sampling frequency (step S4). Thereby, the clock signal generation circuit 13 generates the clock of the instructed oscillation frequency, so as to output the clock to the A/D converter 11 and the color signal demodulation circuit 12.

The A/D converter 11 samples the inputted analog television signal by using the clock from the clock signal generation circuit 13, to thereby convert the analog television signal into a digital signal. The digital signal from the A/D converter 11 is supplied to the color signal demodulation circuit 12. The color signal demodulation circuit 12 color-demodulates the output of the A/D converter 11 by using the clock from the clock signal generation circuit 13, so as to output a color difference signal.

The harmonic component of the analog television signal, which is folded back by the A/D conversion processing of the A/D converter 11, may be included in the color signal band. In this case, the harmonic component is also demodulated by the color demodulation processing. However, the relationship is maintained that the frequency of the beat component, as the difference between the frequency of the fold-back harmonic component and the color subcarrier frequency, is an odd multiple of one-half the vertical frequency, and hence the phase of the light and dark portions is inverted between the respective fields for all the pixels on the screen. That is, the light and dark portions caused by the beat component cancel each other temporally, so that the color stripe can be made invisible in the time axis direction (that is, substantially invisible) on the screen.

In this way, in the present embodiment, the sampling clock is controlled so that the frequency of the beat component, as the difference between the frequency of the fold-back harmonic component and the color subcarrier frequency becomes an odd multiple of one-half the vertical frequency. Thereby, it is possible to prevent that the image quality is degraded on the screen by the light and dark portions caused by the beat component.

Figure 6:
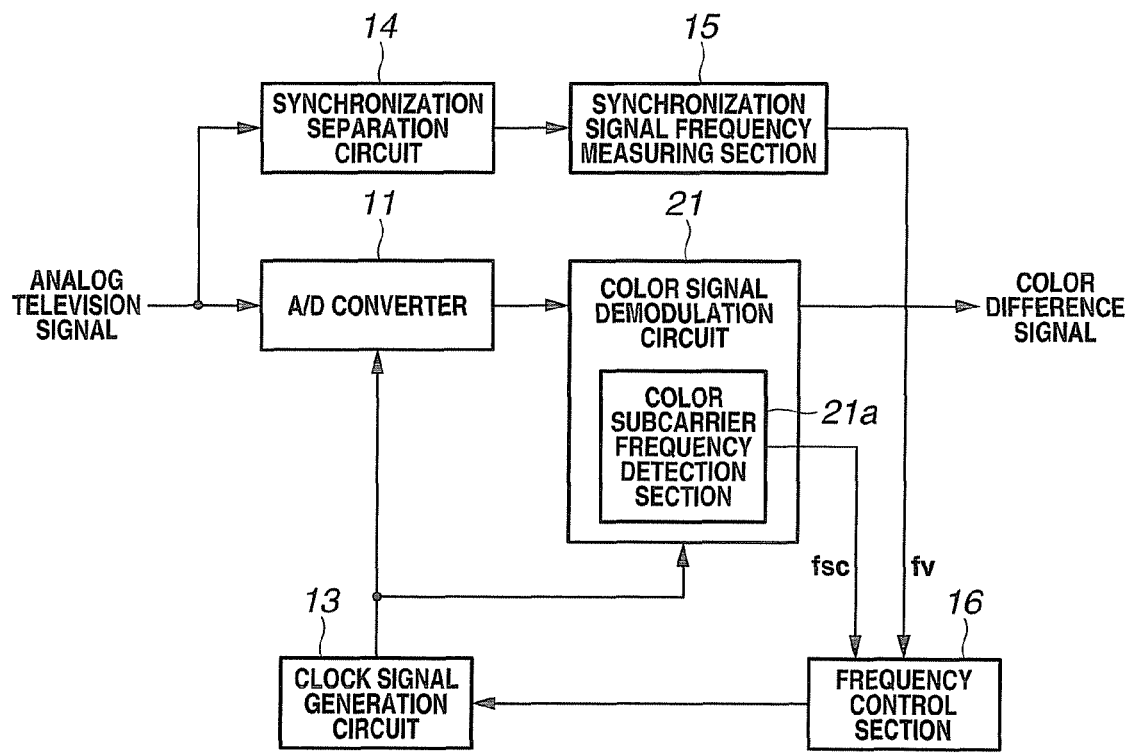
FIG. 6 is a block diagram showing a second embodiment according to the present invention.
Figure 7:
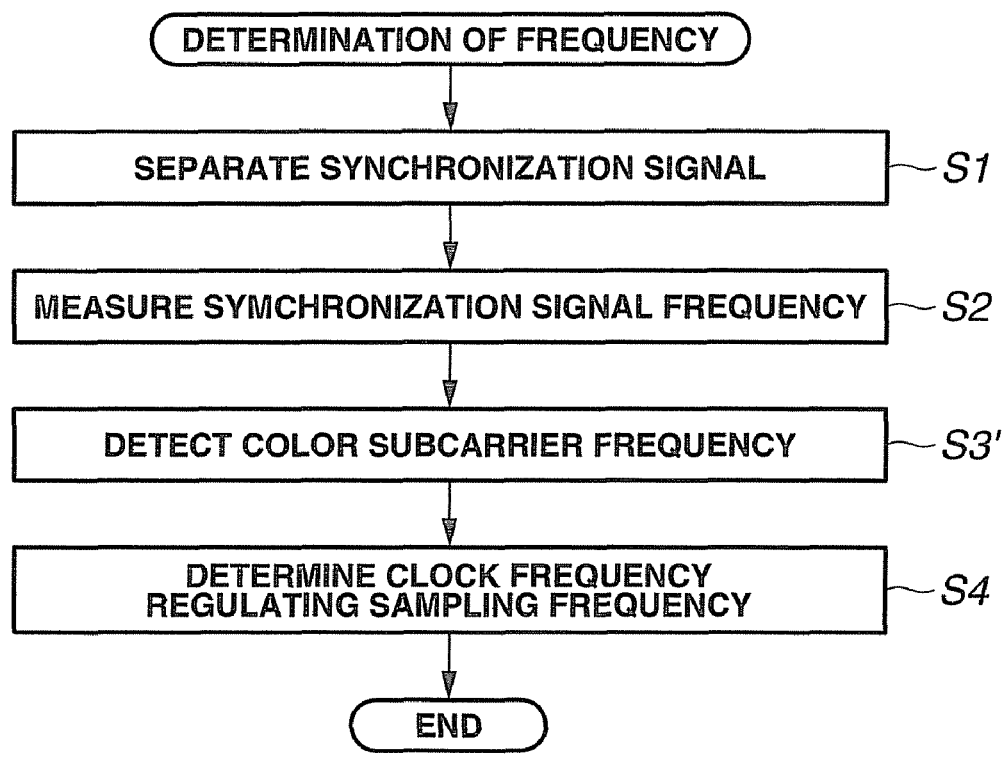
FIG. 7 is a flow chart for explaining an operation of the second embodiment.

FIG. 6 is a block diagram showing a second embodiment according to the present invention. FIG. 7 is a flow chart for explaining an operation of the second embodiment. In FIG. 6, the same components as shown in FIG. 1 are denoted by the same reference numerals, and the explanation of the components is omitted. Further, in FIG. 7, the same procedures as shown in FIG. 5 are denoted by the same reference characters, and the explanation of the components is omitted.

In the analog television signal transmitted from the broadcast station, the relationship of the ratio of the frequencies expressed by Equation (1) is maintained. However, at the time of reception of cable television broadcast and at the time of recording and reproduction by a video recorder, the relationship of the ratio of the frequencies expressed by Equation (1) may not be maintained. In this case, it is considered that a sufficient effect cannot be obtained only by detecting the synchronization signal and obtaining the color subcarrier frequency. Thus, the present embodiment is configured such that the color subcarrier frequency is detected from a color signal demodulation circuit.

The present embodiment is different from the first embodiment in that a color signal demodulation circuit 21 is adopted in place of the color signal demodulation circuit 12. Generally, a color signal processing circuit incorporates therein a digital PLL circuit which performs reproduction of a demodulation carrier used to AM-demodulate a received color subcarrier. This PLL circuit is configured to perform the APC (automatic phase control) operation to detect a phase difference between a PLL output and a color signal, and is configured to detect a difference between the frequency of the color subcarrier and the frequency of the PLL output and also to lock the PLL output to the color subcarrier frequency. That is, the information on the pull-in frequency error can be obtained from the PLL circuit included in the general color signal processing circuit.

Similarly to the color signal demodulation circuit 12, the color signal demodulation circuit 21 can apply color demodulation processing to the output of the A/D converter 11 to output a color difference signal. The color signal demodulation circuit 21 includes a color subcarrier frequency detection section 21a, and is configured, on the basis of the information on the pull-in frequency error, to detect the frequency of the color subcarrier included in the inputted analog television signal, and to output the color subcarrier frequency fsc to the frequency control section 16 (step S3').

Further, the synchronization signal frequency measuring section 15 finds the vertical synchronizing signal fv and outputs the detected signal to the frequency control section 16. Note that since the horizontal synchronization signal frequency fh and the vertical synchronization signal frequency fv have a relationship specified by a broadcast system, the synchronization signal frequency measuring section 15 may be configured to obtain the horizontal synchronization signal fh in place of the vertical synchronization signal fv so as to supply the obtained signal to the frequency control section 16.

When receiving the color subcarrier frequency fsc and the vertical synchronization signal frequency fv, the frequency control section 16 obtains a ratio of these frequencies. On the basis of the ratio of the color subcarrier frequency fsc and the vertical synchronization signal frequency fv, similarly to the first embodiment, the frequency control section 16 controls the clock oscillation frequency of the clock signal generation circuit 13 so that the difference between the frequency of the fold-back harmonic component and the color subcarrier frequency becomes an odd multiple of one-half the vertical frequency.

Other configuration and operations are the same as those of the first embodiment.

In this way, in the present embodiment, it is possible to surely obtain the color subcarrier frequency, even when the frequency relationship expressed by Equation (1) does not exist in the inputted analog television signal. Thereby, even in the present embodiment, the frequency of the beat component, as the difference between the frequency of the unnecessary signal and the color subcarrier frequency, can be set to an odd multiple of one-half the vertical synchronization signal frequency fv, so that the color stripe can be made invisible on the screen.

FIG. 8 is a block diagram showing an example of a television system to which a color signal processing circuit in each of the above described embodiments is mounted.

In recent years, in television systems, more functions have been integrated into a SoC (system on chip) so that main signal processing is completed by one SoC chip. FIG. 8 shows a configuration of a television system in which such a DTV-SoC chip is adopted.

A broadcast signal from an antenna 32 is given to a digital tuner 33. The digital tuner 33 can receive digital broadcast and analog broadcast. The reception signal from the digital tuner 33 is given to a demodulator 34, so as to be demodulated. The demodulation signal from the demodulator 34 is given to a transport processing section (TSP) 36 of a DTV-SoC 31, so that a desired stream is given to an H.264 decoder (H.264Dec) 39 or an MPEG decoder (MPEG2Dec) 40. The H.264Dec 39 and the MPEG2Dec 40 decode the inputted stream, and output the decoded stream to a video processor 46.

Input signals (HDMI-IN) based on a plurality of HDMI (High-Definition Multimedia Interface) standards are given to an HDMI circuit 41 in the DTV-SoC via an HDMI switch 35. The HDMI circuit 41 automatically recognizes various kinds of source apparatus, such as a DVD recorder, and a personal computer, and outputs a signal from the source apparatus to the video processor 46.

Further, the DTV-SoC 31 includes an AV switch 37 which takes in various analog inputs, such as an analog video input, a UXGA input, and an analog audio input. The analog video input inputted via the AV switch 37 is given to a video ADC 42, and the analog audio input is given to an AUDIO ADC 44. Each of the video ADC 42 and the AUDIO ADC 44 converts the inputted analog signal into a digital signal, and outputs the converted signal to the video processor 46.

Further graphical data is also inputted into the video processor 46 from a graphic memory (GFX) 43. Further, a video signal taken in by an Ethernet controller 53 via an Ethernet, and a video signal taken in by a USB controller 52 from a hard disk drive (HDD) 61, and the like, in which a USB standard interface is adopted, can also be inputted into the video processor 46. Note that the Ethernet controller 53 can take in various contents on the Internet 62, and can supply the contents to the video processor 46.

On the other hand, the audio signal from AUDIO ADC 44 is given to an audio processor 47. Further, an SIF input is supplied to an SIF ADC 38 so as to be converted into a digital signal, and thereafter is supplied to an AUDIO demodulation section 45. The AUDIO demodulation section 45 demodulates the inputted digital audio signal, and outputs the demodulated signal to the audio processor 47. The audio processor 47 applies proper voice signal processing to the inputted audio data, and outputs an audio signal via an output terminal 57. The audio signal from the output terminal 57 is supplied to a speaker 64, so that sound output is performed.

The video processor 46 applies proper video signal processing to the inputted video data, and outputs the video signal via an output terminal 56. The video signal from the output terminal 56 is supplied to a display panel 63, so that video display is performed.

The video signal from the video processor 46 is also given to a video encoder (video Enc) 48 for external output. The video Enc 48 encodes the inputted video signal and outputs the encoded signal to a D/A converter (DAC) 49. The DAC 49 converts the inputted digital video signal into an analog signal, and outputs the analog signal as an external output via an output terminal 55.

The color signal processing circuit in each of the above described embodiments is mainly configured by the video processor 46. The video processor 46 applies the processing based on the color signal processing method of each of the above described embodiments to the video signal inputted via the video ADC 42 from the AV switch 37.

Further, a host computer used for internal signal processing, and a high speed CPU 51 used for video signal processing based on a written program are mounted to the DTV-SoC 31. The high speed CPU 51 is configured to be able to realize, on software, the algorithm processing in the color signal processing method of each of the above described embodiments, for example, the processing to control the optimum clock signal, on the basis of an internally measured frequency.

Note that, in some cases, a cryptographic processor unit, such as a CI Module, required for respective regions, is mounted to the DTV-SoC 31. Further, the DTV-SoC 31 includes a memory controller 54, which can read and write video data and audio data from and in various memory media 65.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A color signal processing circuit comprising:
   an analog-to-digital (A/D) converter configured to convert an analog television signal into a digital signal by using a clock;
   a color signal demodulation circuit configured to color-demodulate the television signal converted into the digital signal by the A/D converter;
   a clock generation section configured to generate the clock that is used by the A/D converter; and
   a frequency control section configured to control a clock frequency of the clock generation section based on a color subcarrier frequency of a color signal included in the analog television signal and based on a vertical synchronization signal frequency of the analog television signal, wherein the frequency control section is further configured to control the clock frequency of the clock generation section so that a frequency difference between a frequency of a fold-back harmonic component included in an output of the A/D converter and the color subcarrier frequency of the color signal included in the analog television signal becomes an odd multiple of one-half the vertical synchronization signal frequency of the analog television signal.

2. The color signal processing circuit according to claim 1, wherein in response to a determination that the fold-back harmonic component included in the output of the A/D converter is included in a band of the color signal, the frequency control section controls the clock frequency of the clock generation section.

3. The color signal processing circuit according to claim 1, further comprising:
a synchronization separation circuit configured to separate a synchronization signal included in the analog television signal; and
a frequency measurement section configured to obtain a frequency of the synchronization signal separated by the synchronization separation circuit;
wherein the frequency control section obtains the color subcarrier frequency of the color signal included in the analog television signal based on an output of the frequency measurement section.

4. The color signal processing circuit according to claim 3, wherein the frequency control section is further configured to calculate the color subcarrier frequency from the frequency of the synchronization signal based on a relationship between the synchronization signal and the color signal, the relationship being based on a broadcast system of an analog television broadcast.

5. The color signal processing circuit according to claim 1, wherein the color signal demodulation circuit is further configured to output information on the color subcarrier frequency of the color signal included in the analog television signal, and
wherein the frequency control section is further configured to control the clock frequency of the clock generation section based on information on the color subcarrier frequency, and based on information on a frequency of a synchronization signal included in the analog television signal.

6. The color signal processing circuit according to claim 5, wherein the color signal demodulation circuit is further configured to obtain the color subcarrier frequency based on information on a pull-in frequency error of a phase control loop which generates a signal synchronized with the color signal.

7. The color signal processing circuit according to claim 5, wherein the frequency control section is further configured to control the clock frequency of the clock generation section based on a ratio of the color subcarrier frequency and the frequency of the synchronization signal.

8. A television system comprising:
a reception section configured to take in an analog television signal;
an analog-to-digital (A/D) converter configured to convert the analog television signal into a digital signal by using a clock;
a color signal demodulation circuit configured to color-demodulate the television signal converted into the digital signal by the A/D converter;
a clock generation section configured to generate the clock that is used by the A/D converter; and
a frequency control section configured to control a clock frequency of the clock generation section based on a color subcarrier frequency of a color signal included in the analog television signal and based on a vertical synchronization signal frequency of the analog television signal,
wherein the frequency control section is further configured to control the clock frequency of the clock generation section so that a frequency difference between a frequency of a fold-back harmonic component included in an output of the A/D converter and the color subcarrier frequency of the color signal included in the analog television signal becomes an odd multiple of one-half the vertical synchronization signal frequency of the analog television signal.

9. The television system according to claim 8, wherein in response to a determination that the fold-back harmonic component included in the output of the A/D converter is included in a band of the color signal, the frequency control section controls the clock frequency of the clock generation section.

10. The television system according to claim 8, further comprising:
a synchronization separation circuit configured to separate a synchronization signal included in the analog television signal; and
a frequency measurement section configured to obtain a frequency of the synchronization signal separated by the synchronization separation circuit;
wherein the frequency control section is further configured to obtain the color subcarrier frequency of the color signal included in the analog television signal based on an output of the frequency measurement section.

11. The television system according to claim 10, wherein the frequency control section is further configured to calculate the color subcarrier frequency from the frequency of the synchronization signal based on a relationship between the synchronization signal and the color signal, the relationship being based on a broadcast system of an analog television broadcast.

12. The television system according to claim 8, wherein the color signal demodulation circuit is further configured to output information on the color subcarrier frequency of the color signal included in the analog television signal, and
wherein the frequency control section is further configured to control the clock frequency of the clock generation section based on information on the color subcarrier frequency, and based on information on a frequency of a synchronization signal included in the analog television signal.

* * * * *